US011898377B2

(12) United States Patent
Kelly

(10) Patent No.: US 11,898,377 B2
(45) Date of Patent: Feb. 13, 2024

(54) DOOR AND DRAWER GANG LOCK

(71) Applicant: Industrial Woodworking Corporation, Zeeland, MI (US)

(72) Inventor: Lawrence W. Kelly, Zeeland, MI (US)

(73) Assignee: Industrial Woodworking Corporation, Zeeland, MI (US)

( * ) Notice: Subject to any disclaimer, the term of this patent is extended or adjusted under 35 U.S.C. 154(b) by 273 days.

(21) Appl. No.: 17/388,060

(22) Filed: Jul. 29, 2021

(65) Prior Publication Data

US 2023/0034694 A1 Feb. 2, 2023

(51) Int. Cl.

| | |
|---|---|
| ***E05B 65/462*** | (2017.01) |
| ***E05B 65/52*** | (2006.01) |
| ***E05B 65/00*** | (2006.01) |
| *E05B 49/00* | (2006.01) |

(52) U.S. Cl.

CPC ........ *E05B 65/462* (2013.01); *E05B 65/0003* (2013.01); *E05B 65/523* (2013.01); *E05B 65/5223* (2013.01); *E05B 65/5238* (2013.01); *E05B 49/00* (2013.01)

(58) Field of Classification Search

CPC .... E05B 65/0003; E05B 65/44; E05B 65/462; E05B 65/52; E05B 65/5207; E05B 65/5223; E05B 65/523; E05B 65/5238; E05B 49/00

See application file for complete search history.

(56) References Cited

U.S. PATENT DOCUMENTS

| | | | | | |
|---|---|---|---|---|---|
| 1,486,094 | A * | 3/1924 | Lehman | E05B 65/0003 | 235/22 |
| 2,202,539 | A * | 5/1940 | Siegel | E05B 65/0003 | 312/218 |
| 3,637,277 | A * | 1/1972 | Krug | E05B 65/462 | 70/417 |
| 4,246,769 | A * | 1/1981 | McLaughlin | E05B 65/462 | 312/219 |
| 4,303,288 | A * | 12/1981 | Aschinger | E05B 65/462 | 312/220 |
| 5,257,860 | A * | 11/1993 | Slivon | E05B 65/462 | 312/219 |
| 5,871,263 | A * | 2/1999 | Johnston | E05B 65/462 | 312/215 |
| 5,946,953 | A * | 9/1999 | Feldpausch | E05B 65/462 | 312/219 |
| 6,722,167 | B1 * | 4/2004 | Hsu | E05B 65/462 | 70/79 |

* cited by examiner

*Primary Examiner* — Christopher J Boswell

(74) *Attorney, Agent, or Firm* — Warner Norcross + Judd LLP

(57) ABSTRACT

A gang lock for an article of furniture capable of simultaneously locking and unlocking a plurality of drawers and doors. The gang lock has a single locking mechanism operable to move a drawer lock bar to lock/unlock one or more drawers and a door lock bar to lock/unlock one or more doors. The lock mechanism is coupled to the drawer lock bar so that operation of the lock mechanism causes movement of the drawer lock bar. The drawer lock bar and the door lock bar are coupled together by a linkage so that movement of the drawer lock bar causes movement of the door lock bar. The drawer lock bar may be oriented vertically and the door lock bar may be oriented horizontally. The linkage may include a cam and cam follower to translate vertical movement of the drawer lock bar into horizontal movement of the door lock bar.

8 Claims, 11 Drawing Sheets

DOOR AND DRAWER GANG LOCK

BACKGROUND OF THE INVENTION

The present invention relates to furniture, and more particularly to a gang lock for locking/unlocking drawers and doors in an article of furniture.

To provide secure storage in an article of furniture, it is often desirable to provide furniture with locking drawers and locking doors. It is common for each drawer and each door that is to be lockable to be provided with a separate locking mechanism. The need for multiple locking mechanisms increases material costs, fabrication costs and increases the amount of effort required to lock and unlock all of the drawers and doors. For example, material costs are increased because it is necessary to purchase separate locking mechanisms for each lockable drawer and each lockable door and fabrication costs are increased because it is necessary to install each locking mechanism through a wall in the article of furniture.

The cost and inefficiencies associated with the use of separate locks for each lockable drawer and each lockable door have caused some furniture manufacturers to provide a gang lock capable of locking or unlocking a plurality of stacked drawers through operation of a single locking mechanism. Although gang locks for stacked drawers represent an improvement over the use of separate locks, conventional gang locks are limited in their applicability. For example, conventional gang locks are suitable for use only with vertically stacked drawers that are adjacent to one another and open in the same direction. Further, conventional gang locks do not address the need to have separate locking mechanisms for doors.

Accordingly, there remains room for an improved gang lock that is capable of simultaneously locking and unlocking the doors and drawers of an article of furniture.

SUMMARY OF THE INVENTION

A gang lock for an article of furniture capable of simultaneously locking and unlocking a plurality of drawers and doors is provided. The gang lock has a single locking mechanism that can be operated to articulate a drawer lock bar to lock/unlock one or more drawers and a door lock bar to lock/unlock one or more doors. The drawer lock bar and the door lock bar are coupled together by a linkage so that movement of one lock bar causes, in turn, movement of the other lock bar.

In one embodiment, the drawer lock bar is a vertically movable lock bar that is mounted to the inside surface of the sidewall of the article of furniture in a position adjacent to the sidewalls of the drawers. The drawer lock bar is configured so that vertical movement of the drawer lock bar causes the locking bar to move between a locked position in which it mechanically prevents opening of the drawers and an unlocked position in which it is allows opening of the drawers.

In one embodiment, the drawer lock bar includes a locking tab for each drawer that is coupled to the gang lock. When the drawer lock bar includes a plurality of locking tabs (e.g. when it is coupled with more than one drawer), the locking tabs are spaced apart vertically along the length of the drawer lock bar. Each locking tab is configured to mechanically interact with a paired drawer so that the locking tab locks or unlocks the paired drawer based on the position of the drawer lock bar. For example, in one embodiment, each locking tab is configured to mechanically interfere with opening of the corresponding drawer when the drawer lock bar is in the locked position and to not interfere with opening of the corresponding drawer when the drawer lock bar is in the unlocked position.

In one embodiment, the locking tabs are integral with the drawer lock bar. The drawer lock bar may be formed from flat stock and the locking tabs may be stamped and bent from the flat stock.

In one embodiment, each drawer includes a stop that is configured to travel with the drawer and to mechanically engage with the paired locking tab when the drawer lock bar is in the locked position. For example, the stop may be an integral part of the drawer or may be a separate component that is mounted to the drawer. In one embodiment, the stop is a wedge-shaped component affixed to the side of the drawer, for example, by one or more fasteners. When the drawer lock bar is in the locked position, each locking tab extends into the path along which the corresponding stop must travel for the paired drawer to be opened. When a user attempts to open the drawer when the drawer lock bar is locked, the stop comes into engagement with the corresponding locking tab, thereby preventing the drawer from being opened. When the drawer lock bar is in the unlocked position, each locking tab is moved out of the path of the corresponding stop, thereby allowing the drawers to be opened.

In one embodiment, the door lock bar is a horizontally extending lock bar that is movable in a horizontal direction between locked and unlocked positions. The door lock bar includes a hook that selectively engages with the door when the door lock bar is in the locked position to lock the door in the closed position. The door may include a strike plate that defines a slot configured to operate with the hook. When the door lock bar is in the locked position, the hook is engaged with the strike plate to prevent the door from being opened. When the door lock bar is in the unlocked position, the hook is disengaged from the strike plate to allow the door to be opened.

In one embodiment, the article of furniture includes two doors and the door lock bar engages only with one of the two doors. In this embodiment, the other door may be latched closed by a rooster catch or other similar latching mechanism that is only accessible when the door that is coupled to the door lock bar is opened.

In an alternative embodiment, the article of furniture includes two doors and the door lock bar is operatively coupled to both doors. For example, the door lock bar may include a first hook that engages with the first door and a second hook that engages with the second door when the door lock bar is in the locked position.

In one embodiment, the gang lock includes a locking mechanism that is accessible from the exterior of the article of furniture. The gang lock may incorporate essentially any locking mechanism that can be operated to actuate the drawer lock bar and the door lock bar.

In one embodiment, the locking mechanism has a cam that is selectively movable between a locked position and an unlocked position. The cam may extend from the interior of the locking assembly and be interoperably engaged with the drawer lock bar so that movement of the cam between the locked and unlocked position causes movement of the drawer lock bar and the door lock bar between their respective locked and unlocked positions.

In one embodiment, the cam is coupled to the drawer lock bar in a manner that converts pivotal motion of the cam into linear motion of the drawer lock bar. For example, in one embodiment, the cam defines a cam slot and the drawer lock bar includes a cam follower (e.g. a pin) that is movably fitted within the cam slot. As the cam is pivoted, the vertical component of the movement of the cam is converted into vertical movement of the drawer lock bar, while the horizontal component of the movement of the cam is essentially lost as the pin moves along the slot.

In one embodiment, the locking mechanism includes an electronic lock that generally includes a knob, a keypad and an internal electrically-operated actuator. In one embodiment, the knob is coupled to the cam so that rotation of the knob results in corresponding movement of the cam. For example, the knob is rotated in one direction to move the cam into the locked position and in the opposite direction to move the cam into the unlocked position. In this embodiment, the actuator is movable between an engaged position in which the actuator is mechanically engaged with the knob/cam combination to prevent movement of the knob/cam combination and an unlocked positon in which the actuator is disengaged from the knob/cam combination to allow movement of the knob/cam combination. In this embodiment, the actuator may include a solenoid or other similar mechanism that is capable of mechanically interlocking with a corresponding structure in the knob/cam combination to prevent movement of the knob/cam combination out of the locked position. The electronic lock of one embodiment includes a controller that moves the actuator into the unlocked position only when the appropriate security code is entered on the keypad. Once in the unlocked position, the knob can be manually rotated to move the cam into the unlocked position, thereby simultaneously unlocking the drawers and the doors. In one embodiment, the key pad includes a “lock” button. When the lock button is pushed, the controller causes the actuator to return to the engaged position to lock the knob/cam combination against rotation until the security code is again entered on the key pad.

In one embodiment, the drawer lock bar is operatively coupled to the door lock bar by a linkage that translates vertical motion of the drawer lock bar into horizontal motion of the door lock bar. This causes the drawer lock bar and the door lock bar to move in unison between locked and unlocked positions so that operation of a single locking mechanism simultaneously locks or unlocks the drawers and the doors.

In one embodiment, the linkage joining the drawer lock bar and the door lock bar includes a cam arrangement. For example, in one embodiment, the door lock bar includes a cam and the drawer lock bar includes a cam follower. In one embodiment, the cam defines a cam slot that receives a cam follower mounted to the drawer lock bar. The cam slot is configured so that downward movement of the drawer lock bar results in retraction of the door lock bar (i.e., movement of the door lock bar toward the sidewall of the article of furniture) into the unlocked position.

The current embodiments provide an apparatus that allows simultaneous locking and unlocking of at least one drawer and at least one door in an article of furniture. This allows a user to lock or unlock a plurality of drawers and doors in an article of furniture efficiently with a single motion, rather than requiring actuation of separate locking mechanisms for the drawers and the doors. Use of a single locking mechanism also reduces cost compared with a conventional system that incorporates a separate locking mechanism for each drawer and a separate locking mechanism for each door. The present invention can be easily implemented using a wide range of alternative locking mechanisms that are selected based on consumer preference, such as a simply key lock or a more complex fingerprint scanner.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of “including” and “comprising” and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
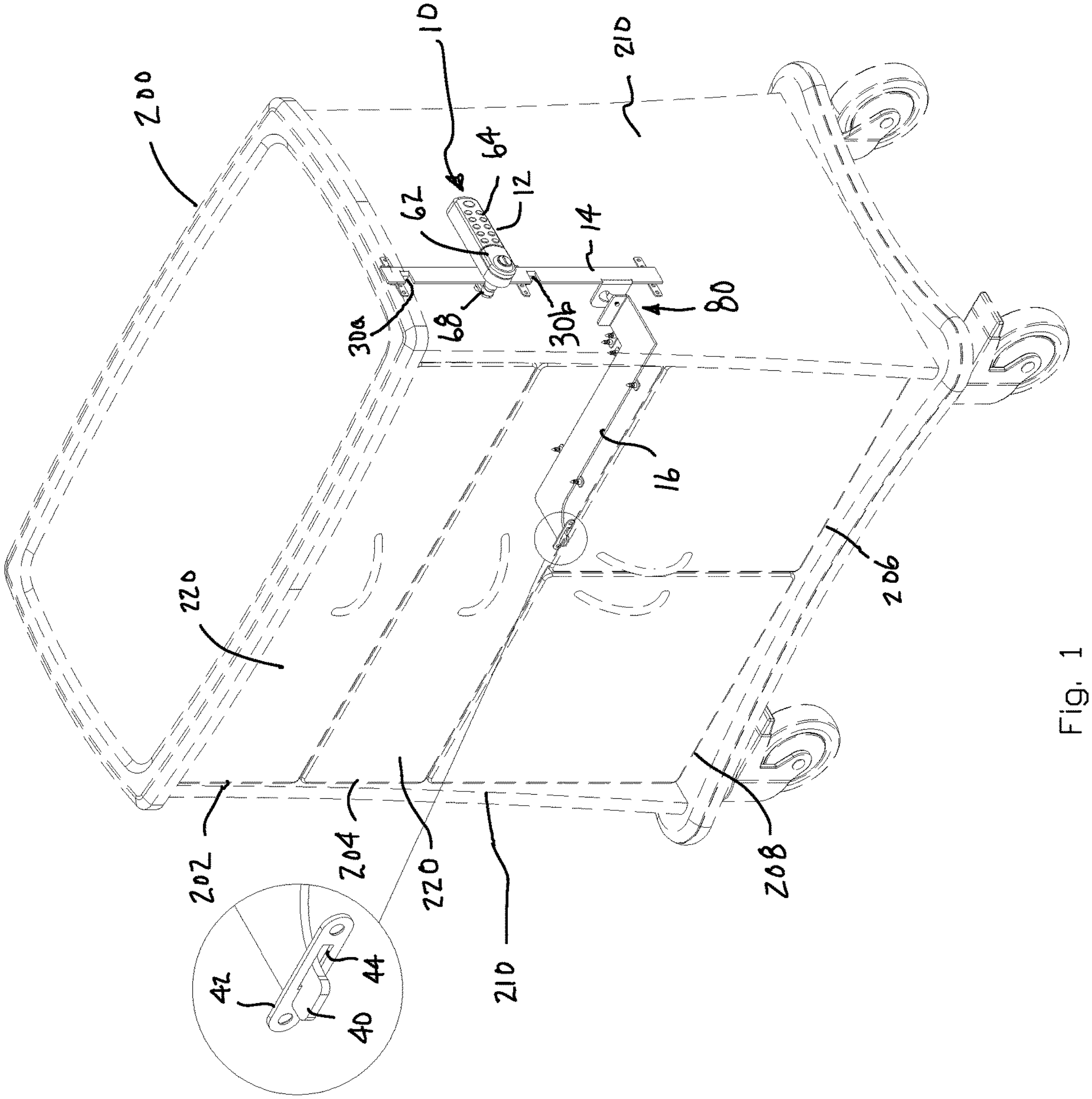
FIG. 1 is a perspective view of a cabinet incorporating a gang lock in accordance with a current embodiment showing the gang lock in the locked position.
Figure 2:
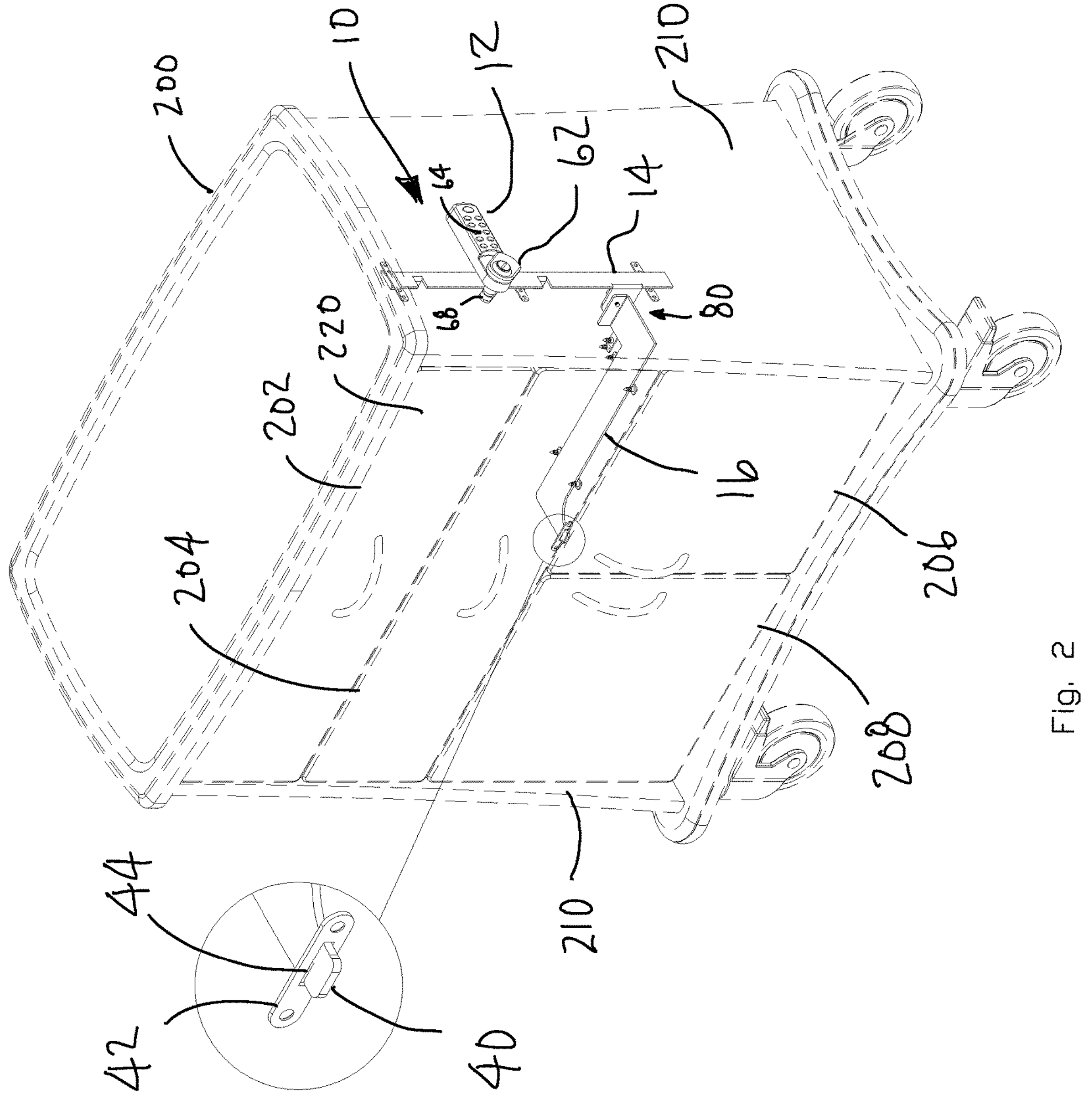
FIG. 2 is a perspective view of the cabinet showing the gang lock in the unlocked position.
Figure 3:
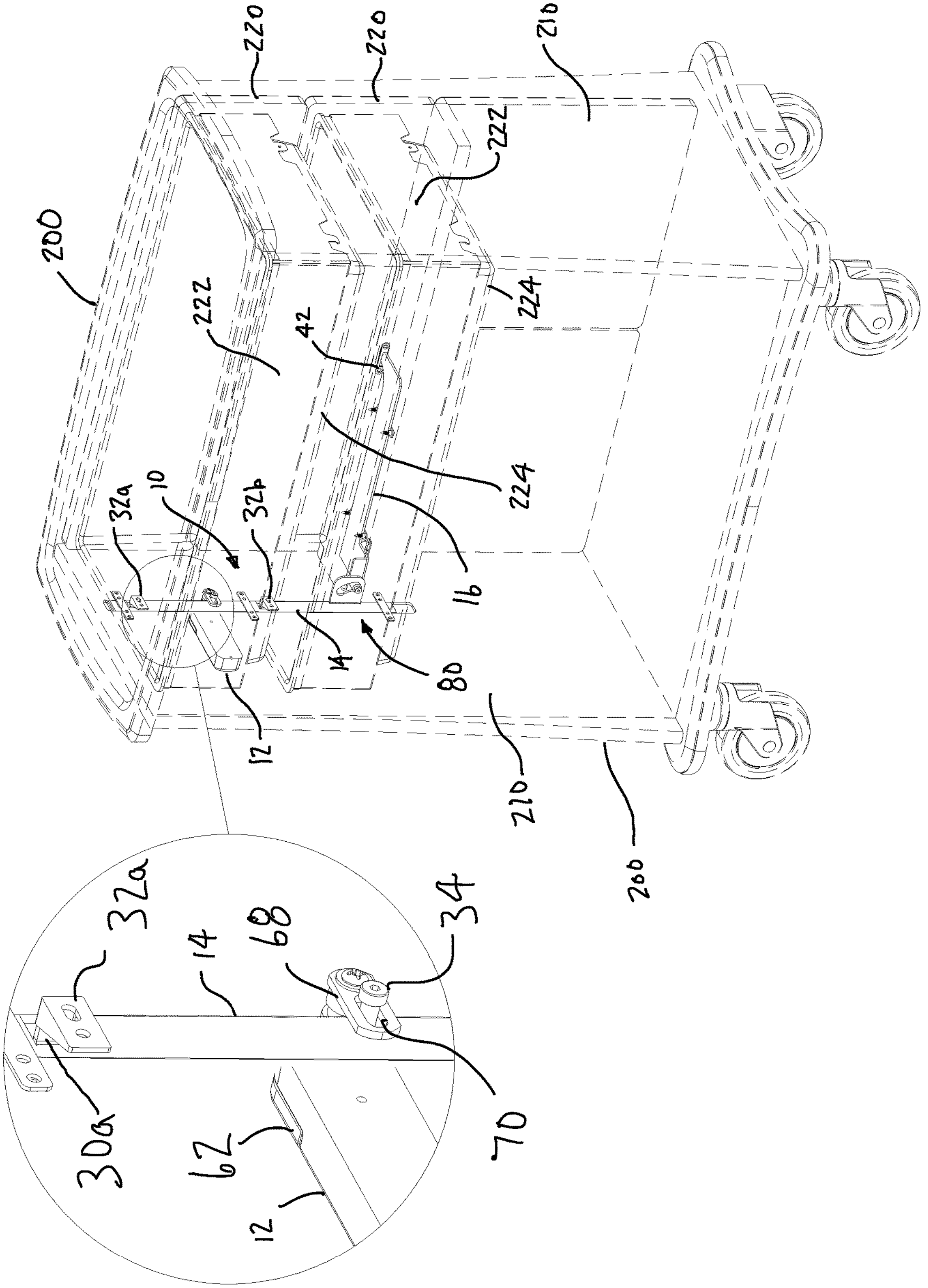
FIG. 3 is a rear perspective view of the cabinet showing the gang lock with an enlarged view of a portion of the gang lock shown in the locked position.
Figure 4:
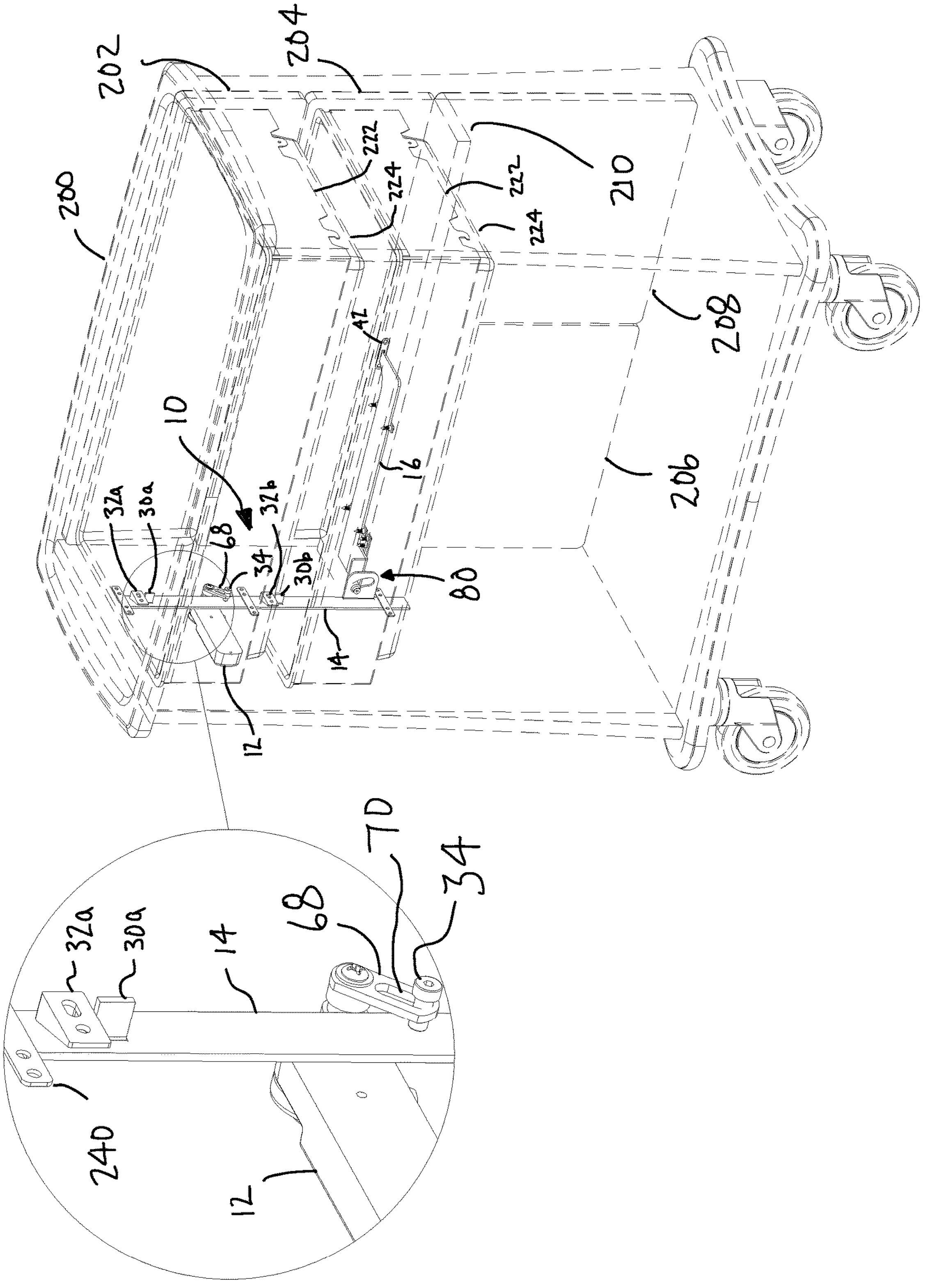
FIG. 4 is a rear perspective view of the cabinet showing the gang lock with an enlarged view of a portion of the gang lock shown in the unlocked position.

Overview.

A cabinet 200 incorporating a gang lock in accordance with an embodiment of the present invention is shown in FIGS. 1-6 and generally designated 10. The gang lock 10 is shown installed in a cabinet 200 having two vertically stacked drawers 202, 204 and two side-by-side doors 206, 208 that cooperatively close an internal cabinet space. The gang lock 10 generally includes a locking mechanism 12, a drawer lock bar 14 and a door lock bar 16. The locking mechanism 12 is configured to simultaneously move the drawer lock bar 14 and the door lock bar 16 between locked and unlocked positions. The drawer lock bar 14 is operatively coupled to the two drawers 202, 204 and is movable between a locked position in which the drawer lock bar 14 interferes with and prevents the drawers 202, 204 from being opened and an unlocked position in which the drawer lock bar 14 does not interfere with and allows the drawers 202, 204 to be opened. Similarly, the door lock bar 16 is operatively coupled with at least one door 206 or 208 and is movable between a locked position in which the door lock bar 16 in engaged with the door 206 or 208 to prevent the door 206 or 208 from being opened and an unlocked position in which the door lock bar 16 is disengaged from the door 206 or 208 to allow opening of the door 206 or 208. In the illustrated embodiment, the drawer lock bar 14 and the door lock bar 16 are operatively coupled by a linkage 20 that is configured such that movement of the drawer lock bar 14 results in simultaneous movement of the door lock bar 16.

Cabinet with Gang Lock

For purposes of disclosure and not by way of limitation, the present invention is described in the context of a wheeled cabinet 200 having a pair of vertically stacked drawers 202, 204 disposed above a cabinet space that is closed by a pair of side-by-side doors 206, 208. To facilitate disclosure, FIGS. 1-6 show the outline of the cabinet 200 in broken lines and the gang lock 10 is visible through the cabinet 200. In this embodiment, each drawer 202, 204 includes a drawer front 220, a drawer frame 222 and a plastic tub 224. The drawer frame 222 is mounted to the backside of the drawer front 220 and defines an opening of appropriate size to receive the plastic tub 224. The plastic tub 224 is seated within the drawer frame 222 and includes a peripheral lip that rests upon the top of the frame 222 when the tub 224 is properly seated. Each drawer 202, 204 is mounted to opposite sidewalls 210 by drawer slides (not shown). The doors 206, 208 are mounted to the sidewalls 210 using conventional hinges (not shown). The cabinet 200 is merely exemplary and a gang lock in accordance with the present invention may be used in other articles of furniture with different numbers, styles and arrangements of drawers and different numbers, styles and arrangements of doors.

Figure 7:
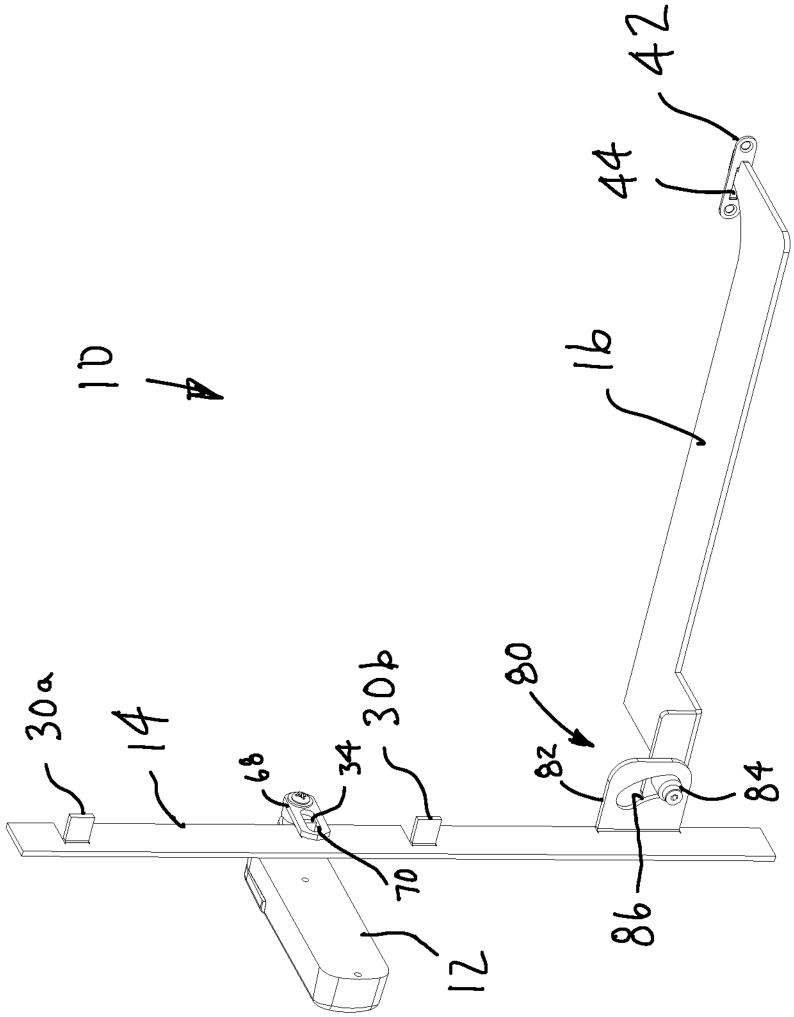
FIG. 7 is a right, front perspective view of the gang lock.
Figure 8:
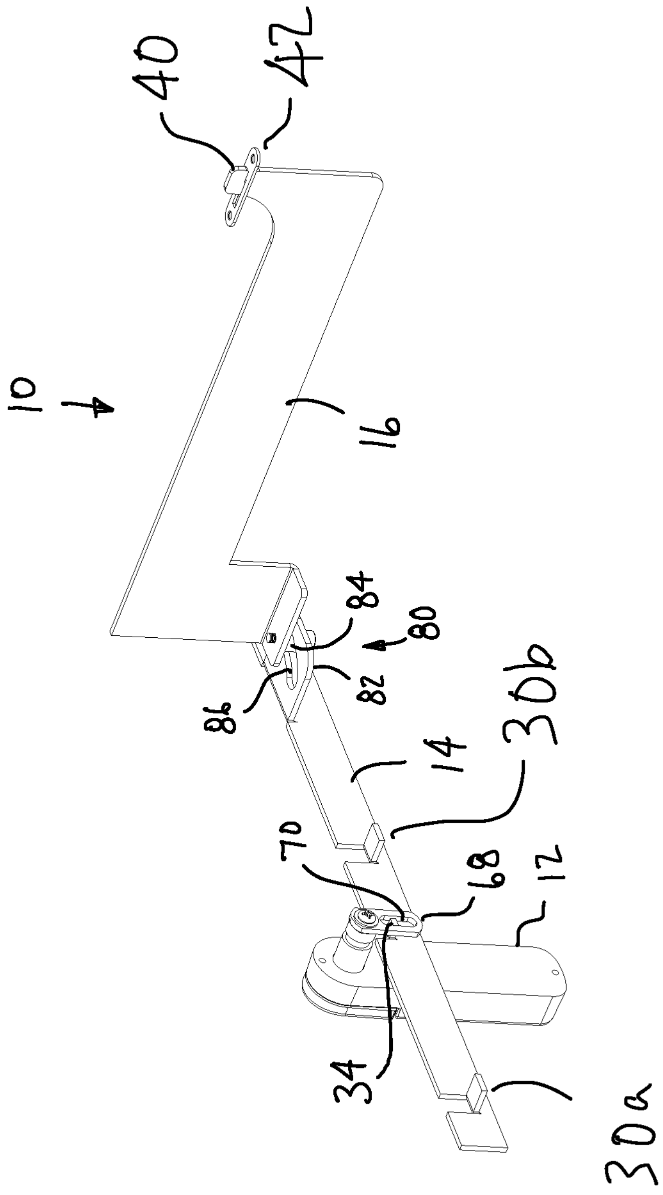
FIG. 8 is a left, front perspective view of the gang lock.
Figure 9:
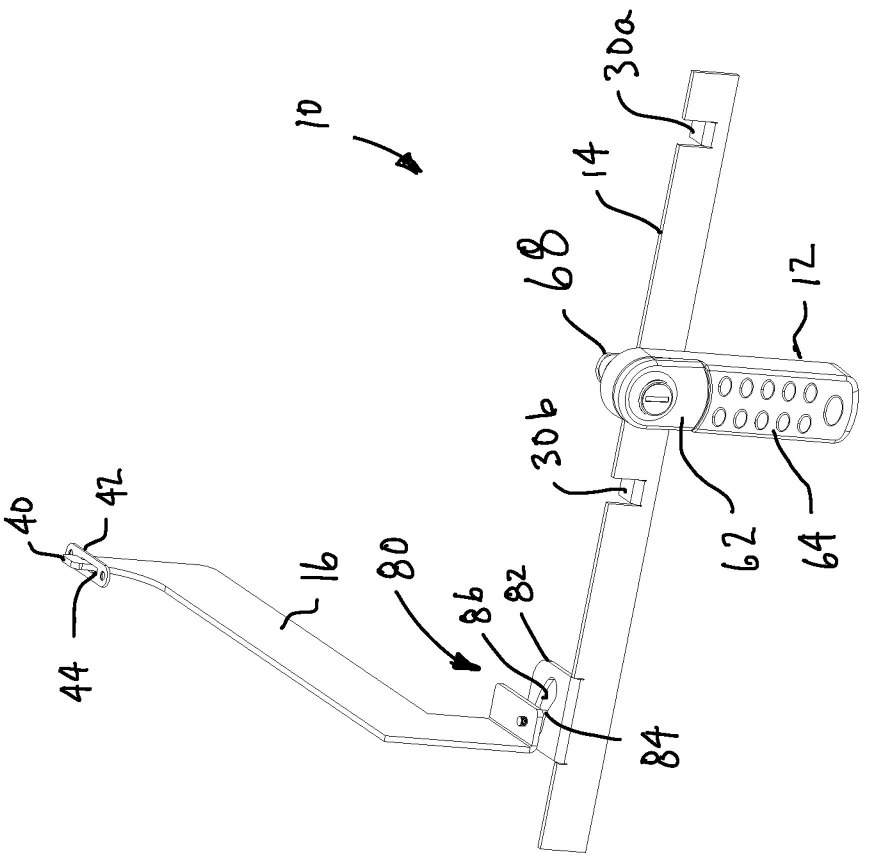
FIG. 9 is a left, rear perspective view of the gang lock.
Figure 10:
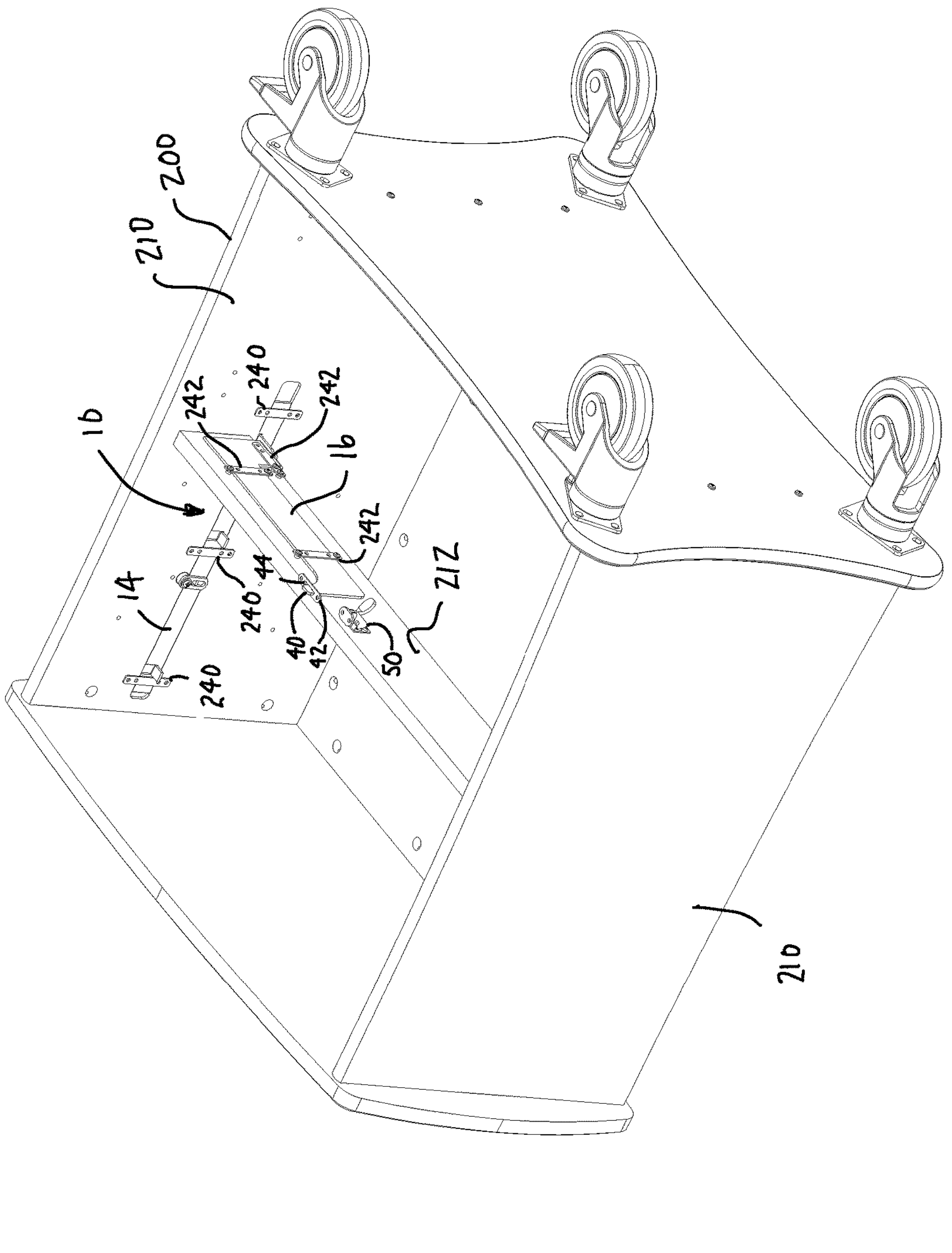
FIG. 10 is a perspective view of the cabinet with the drawers and doors removed to show the gang lock mounted within the cabinet.

Referring now to FIGS. 7-9, the gang lock 10 generally includes a locking mechanism 12, a drawer lock bar 14 and a door lock bar 16. The locking mechanism 12 is mounted to the sidewall 210 and is accessible from the exterior of the cabinet 200. As perhaps best shown in FIGS. 10 and 11, the drawer lock bar 14 is mounted to the inside surface of the sidewall 210 and the door lock bar 16 is mounted to the under surface of the drawer rail 212. In this embodiment, the gang lock 10 is configured to provide simultaneously locking and unlocking of a plurality of drawers 202, 204 and doors 206, 208 through operation of locking mechanism 12. More specifically, the gang lock 10 has a single locking mechanism 12 that is selectively operable to articulate the drawer lock bar 14 to lock/unlock one or more drawers 202, 204 and the door lock bar 16 to lock/unlock one or more doors 206, 208.

In the illustrated embodiment, the drawer lock bar 14 is a vertically movable lock bar that is mounted to the inside surface of the sidewall 210 of the cabinet 200 in a position adjacent to the drawers 202, 204. The drawer lock bar 14 is configured so that vertical movement of the drawer lock bar 14 moves the drawer lock bar 14 between a locked position in which the drawer lock bar 14 mechanically prevents opening of the drawers 202, 204 and an unlocked position in which the drawer lock bar 14 allows free movement of the drawers 202, 204. In the illustrated embodiment, the drawer lock bar 14 is recessed into the inside surface of the sidewall 210 (See FIGS. 10 and 11). For example, the drawer lock bar 14 may be recessed so that it is flush with the inside surface of the sidewall 210. The drawer lock bar 14 of this embodiment is secured to the sidewall 210 by three straps 240 that are fastened, for example, by screws. Recessing the drawer lock bar 14 allows drawer slides (not shown) to be mounted to the inside surface of the sidewall 210 without interference from the drawer lock bar 14. The drawer lock bar 14 need not, however, be recessed. For example, in alternative embodiments, the drawer lock bar 14 may not be recessed, but the drawer slides (not shown) may be mounted to the sidewall 210 with spacers that space the drawer slides away from the inside surface of the sidewall 210 a sufficient distance to accommodate the drawer lock bar 14.

Figure 5:
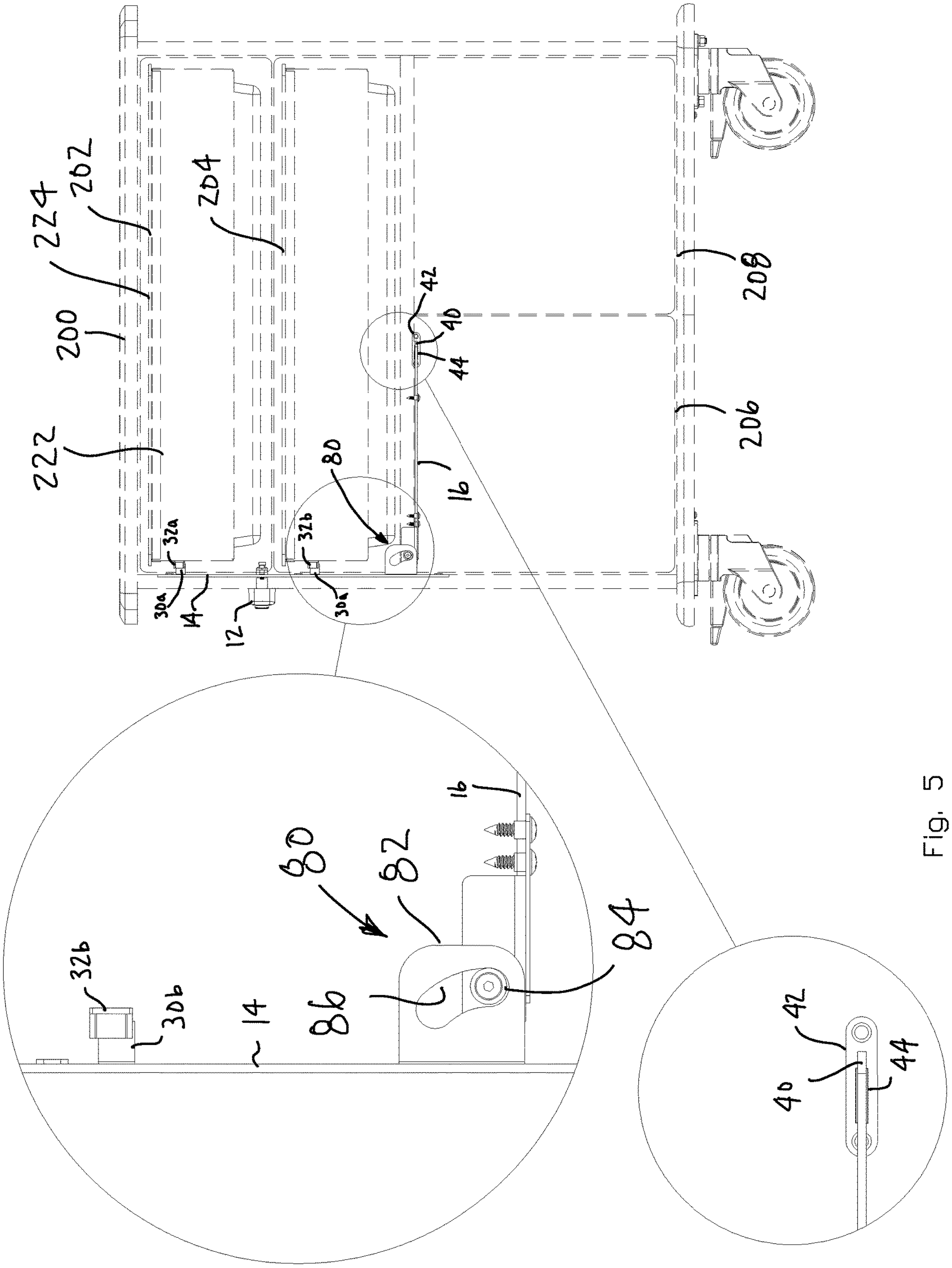
FIG. 5 is a rear view of the cabinet showing the gang lock with enlarged views showing the linkage and a portion of the door lock bar in the locked position.
Figure 6:
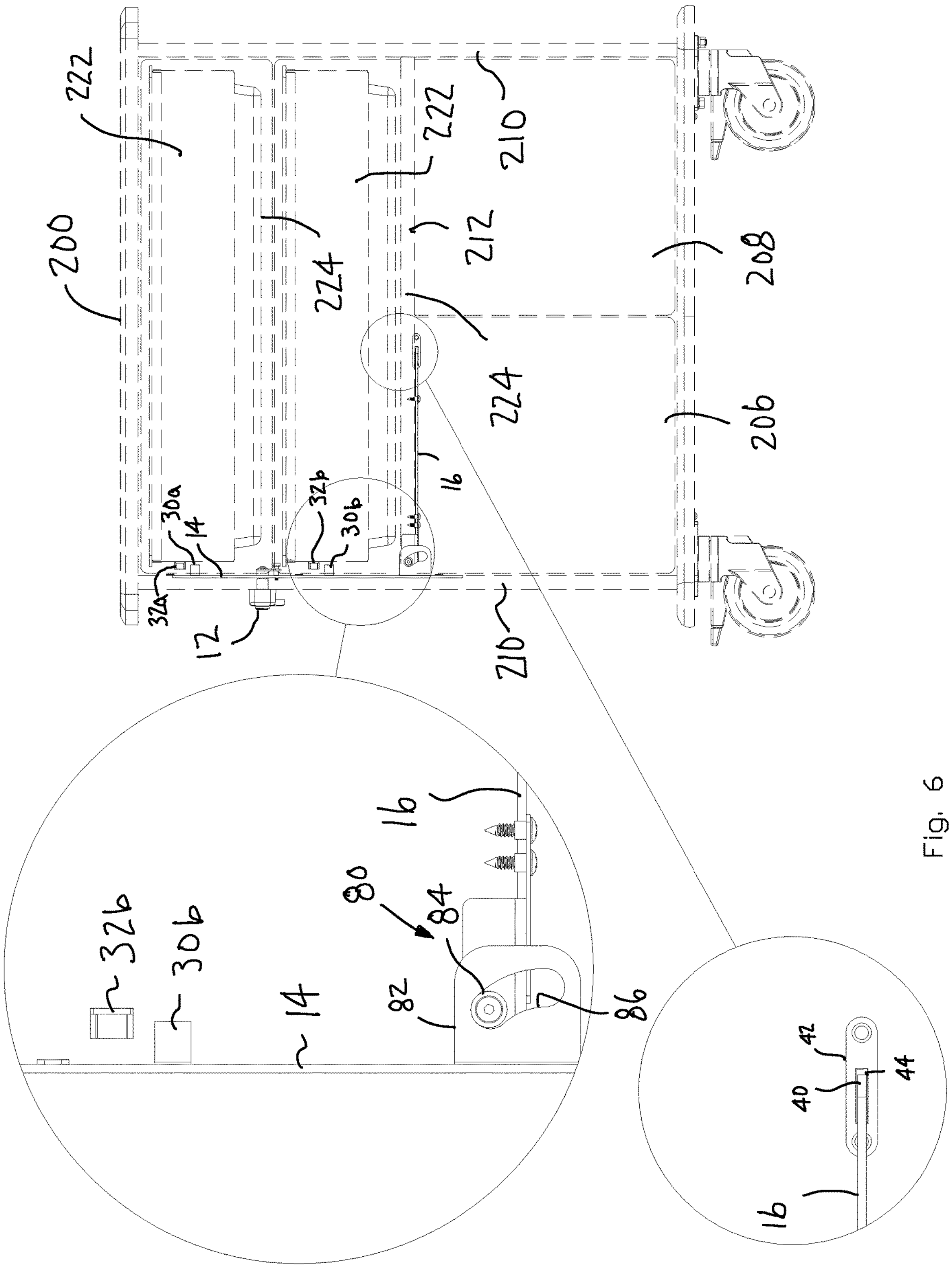
FIG. 6 is rear view of the cabinet showing the gang lock with enlarged views showing the linkage and a portion of the door lock bar in the unlocked position.

Referring now to FIGS. 3-6, the drawer lock bar 14 of the illustrated embodiment is configured to operatively interact with two drawers 202, 204. In this context, the drawer lock bar 14 includes a pair of locking tab 30*a*, 30*b*— one for each drawer 202, 204. More specifically, FIGS. 5 and 6 show a first locking tab 30*a* that is paired with the top drawer 202 and a second locking tab 30*b* that is paired with the bottom drawer 204. Although the present invention is described in the context of a cabinet having two vertically stacked drawers, the drawer lock bar 14 can be configured to operatively interact with a different number and/or different arrangement of drawers. For example, the length of the drawer lock bar 14 and the number and position of locking tabs may be varied from application to application to allow operation with a different number and/or different arrangement of drawers. In one exemplary alternative embodiment (not shown), the cabinet 200 may include a third drawer stacked vertically above the top drawer 202. In this alternative embodiment, the length of the drawer lock bar 14 may be extended and an additional locking tab (not shown) may be added to operatively interact with the third drawer.

In the illustrated embodiment, each locking tab 30*a-b* is configured to mechanically interact with the paired drawer 202, 204 so that the locking tab 30*a-b* locks or unlocks the paired drawer 202, 204 based on the position of the locking tab 30*a-b* relative to the drawer 202, 204. In the illustrated embodiment, each locking tab 30*a-b* is configured to mechanically interfere with opening of the corresponding drawer 202, 204 when the drawer lock bar 14 is in the locked position and to not interfere with opening of the corresponding drawer 202, 204 when the drawer lock bar 14 is in the unlocked position. More specifically, the drawer lock bar 14 is configured so that when the drawer lock bar 14 is in the locked position a portion of the drawer lock bar 14 blocks the drawer 202, 204 from being opened and when the drawer lock bar 14 is in the unlocked positon that portion of the drawer lock bar 14 is moved so that it does not block the drawer 202, 204 from being opened.

As perhaps best shown in FIG. 8, the locking tabs 30*a-b* of the illustrated embodiment are integral with the drawer lock bar 14. For example, the drawer lock bar 14 may be formed from flat stock and the locking tabs 30*a-b* may be stamped and bent from the flat stock. In this illustrated embodiment, each locking tab 30*a-b* is stamped and bent to extend perpendicular to the longitudinal extent of the drawer locking bar 14. The locking tabs 30*a-b* need not be integrally formed from the drawer lock bar 14, but may be separately manufactured and then affixed to the drawer lock bar 14.

In the illustrated embodiment, each locking tab 30*a-b* is configured to operatively interact with a stop 32*a-b* that is associated with the paired drawer 202, 204. For example, a stop 32*a-b* may be an integral part of the drawer 202, 204 (such as a corner, edge or protrusion) or the stop 32*a-b* may be a separate component that is mounted to the drawer 202, 204. Referring now to FIGS. 3-6, each stop 32*a-b* of the illustrated embodiment is a wedge-shaped component rigidly affixed to the side of the drawer 202, 204, for example, by screws or other fasteners. The stops 32*a-b* are configured to travel with the drawer 202, 204 and to mechanically engage with the paired locking tab 30*a-b*, but only when the drawer lock bar 14 is in the locked position. When the drawer lock bar 14 is in the locked position, each locking tab 30*a-b* extends into the path along which the corresponding stop 32*a-b* must travel for the paired drawer 202, 204 to be opened (See, for example, the enlarged region in FIG. 3). In the illustrated embodiment, each locking tab 30*a-b* is configured to extend almost immediately adjacent to the paired stop 32*a-b* when in the locked position. This reduces the amount of play or potential movement associated with a locked drawer 202, 204. When a user attempts to open the drawer 202, 204 when the drawer lock bar 14 is locked, the stop 32*a-b* abuts or comes into engagement with the corresponding locking tab 30*a-b*, thereby preventing the drawer 202, 204 from being opened. When the drawer lock bar 14 is in the unlocked position, the locking tabs 30*a-b* are moved vertically out of the path of the corresponding stop 32*a-b*, thereby allowing the stops 32*a-b* to pass the drawer lock bar 14 and the drawers 202, 204 to be opened (See, for example, the enlarged region in FIG. 4).

As noted above, the gang lock 10 includes a door lock bar 16 that operatively interacts with at least one door. In the illustrated embodiment, the door lock bar 16 is a horizontally extending lock bar that is movable in a horizontal direction between locked and unlocked positions. The door lock bar 16 is movably mounted to the underside of the drawer rail 212 (See FIGS. 10 and 11) and is operatively coupled to the drawer lock bar 14 so that the door lock bar 16 is moved simultaneously with the drawer lock bar 14 as discussed in more detail below. As shown, the door lock bar 16 may be secured to the drawer rail 212 by three straps 242 that are affixed to the drawer rail 212, for example, by screws. Spacers may be fitted under the screws to accommodate the thickness of the door lock bar 16.

In the illustrated embodiment, the door lock bar 16 includes a hook 40 that selectively engages with the door 206 when the door lock bar 16 is in the locked position to secure the door 206 in the closed position. The door 206 of this embodiment includes a strike plate 42 that defines a slot 44 configured to operate with the hook 40. When the door lock bar 16 is in the locked position, the hook 40 is engaged with the strike plate 42 to prevent the door 206 from being opened (See, for example, the enlarged region in FIG. 1). When the door lock bar 16 is in the unlocked position, the hook 40 is disengaged from the strike plate 42 to allow the door 206 to be opened (See, for example, the enlarged region in FIG. 2).

The cabinet 200 of the illustrated embodiment includes two doors 206, 208 and the door lock bar 16 engages only with door 206. In this embodiment, the other door 208 is latched closed by a rooster catch 50 or other similar latching mechanism that is located within the internal space behind the doors 206, 208 where it is only accessible when the door 206 that is coupled to the door lock bar 16 is opened. In the illustrated embodiment, the main body of the rooster catch 50 is mounted to the drawer rail 212 adjacent to door 208 and the latch plate is mounted to the door 208 in operative alignment with the main body of the rooster catch 50. In use, the main body automatically interlock with the latch plate when the door 208 is closed. Alternatively, the door lock bar 16 may be configured to operatively interact with both doors 206, 208. For example, the door lock bar 16 may be lengthened and it may include a first hook (e.g. hook 40) that engages with the first door 206 and a second hook (not shown) that engages with the second door 208 when the door lock bar 16 is in the locked position. In alternative embodiments of this type, the second door 208 may include a strike plate that defines a slot configured to receive the second hook in essentially the same manner as described in connection with hook 40 and strike plate 42.

It should also be noted that the gang lock 10 could be readily adapted to lock/unlock a second set of doors (not shown). For example, if the cabinet 200 included a second set of doors, the gang lock could be provided with a second door lock bar (not shown) that is configured to operatively interact with the second set of doors. To implement this alternative embodiment, the door lock bar 14 may be provided with a second cam configured to couple to the second door lock bar through a linkage similar to linkage 80.

The gang lock 10 includes a locking mechanism 12 that is accessible from the exterior of the cabinet 200. The gang lock 10 is configured to allow the drawers 202, 204 and the doors 206, 208 to be locked and unlocked simultaneously through operation of only a single locking mechanism 12. In the illustrated embodiment, the locking mechanism 12 is directly coupled to the drawer lock bar 14 so that operation of the locking mechanism 12 selectively raises or lowers the drawer lock bar 14 to move it between the locked and unlocked positions.

Figure 11:
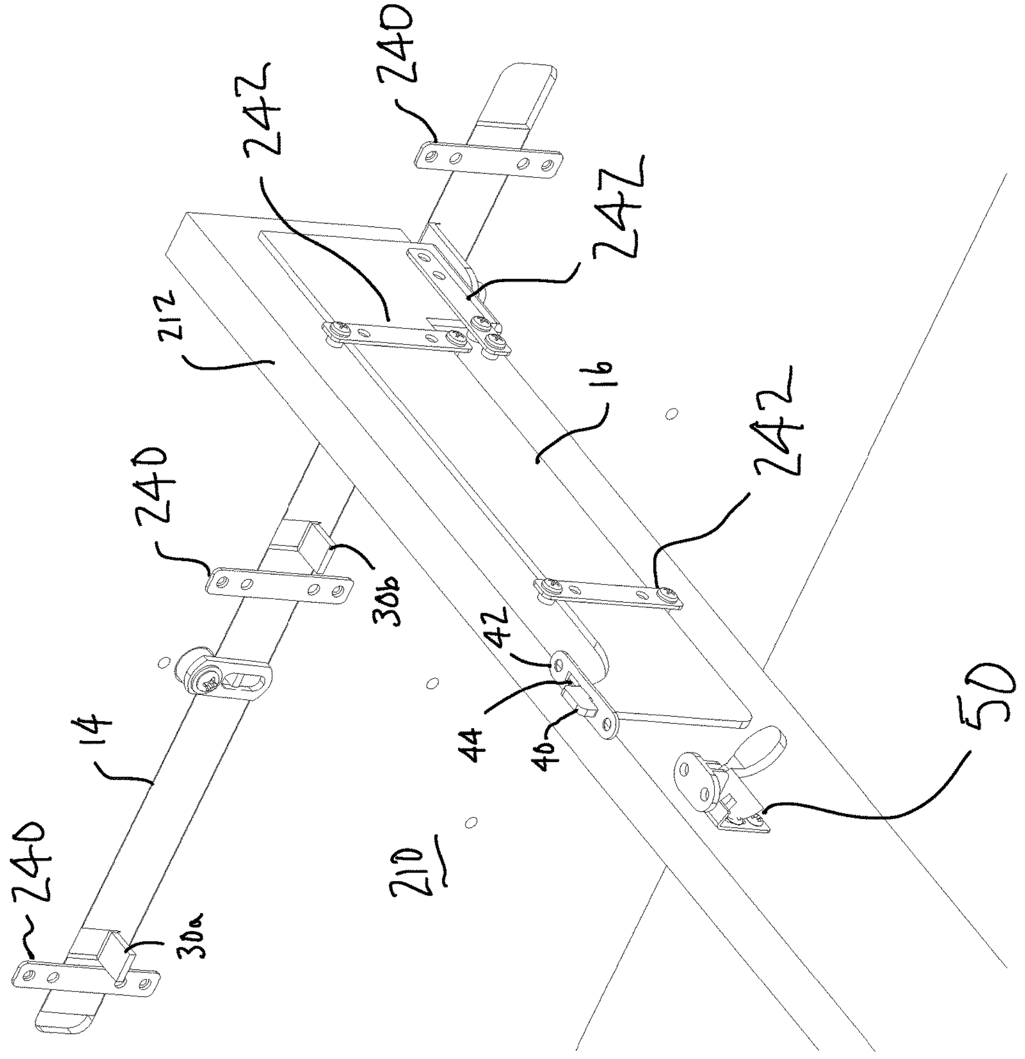
FIG. 11 is an enlarged view of a portion of FIG. 10 showing the gang lock mounted within the cabinet.

Although the locking mechanism may vary from application to application, the locking mechanism 12 of the illustrated embodiment has a cam 68 that extends into the interior of the cabinet 200 and is coupled to the drawer lock bar 14 (See FIGS. 8, 9 and 11). Through operation of the locking mechanism 12, the cam 68 is pivotally movable between a locked position and an unlocked position, which in turn moves the drawer lock bar 14 and the door lock bar 16 between their respective locked and unlocked positions.

In the illustrated embodiment, the cam 68 is coupled to the drawer lock bar 14 in a manner that converts pivotal motion of the cam 68 into linear motion of the drawer lock bar 14. In this embodiment, the cam 68 defines a cam slot 70 and the drawer lock bar 14 includes a cam follower 34 (e.g. a pin) that is movably fitted within the cam slot 70. As the cam 68 is pivoted, the vertical component of the movement of the cam 68 is converted into vertical movement of the drawer lock bar 14, while the horizontal component of the movement of the cam 68 is essentially lost as the cam follower 34 moves along the cam slot 70. In this illustrated embodiment, the cam follower 34 is defined by a pin that is stamped and bent from the flat stock forming the drawer lock bar 14. In alternative embodiments, the cam follower may be a separate component that is affixed to the drawer lock bar 14.

Although the gang lock 10 may incorporate essentially any locking mechanism that can be operated to actuate the drawer lock bar 14 and the door lock bar 16, the locking mechanism 12 of the illustrated embodiment is an electronic lock with a knob 62, a keypad 64 for entering a combination and an internal electrically-operated actuator (not shown). In this embodiment, the knob 62 and the cam 68 are interconnected so that the rotation of the knob 62 results in corresponding rotation of the cam 68. In the illustrated embodiment, the knob 62 is rotated in one direction to move the cam 68 into the locked position and in the opposite direction to move the cam 68 into the unlocked position. In this embodiment, the actuator (not shown) is movable between an engaged position in which the actuator is mechanically engaged with the knob/cam combination to prevent movement of the knob/cam combination and an unlocked positon in which the actuator is disengaged from the knob/cam combination to allow movement of the knob/cam combination. The actuator of the illustrated embodiment may include a solenoid or other similar mechanism (not shown) that is capable of mechanically interlocking with corresponding structure in the knob/cam combination to prevent movement of the knob/cam combination out of the locked position. The electronic lock of the illustrated embodiment includes a controller (not shown) that moves the actuator into the unlocked position only when the appropriate security code is entered on the keypad 64. The illustrated keypad 64 includes a "lock" button. When the lock button is pushed, the controller (not shown) causes the actuator to return to the engaged position to lock the knob/cam combination against rotation until the security code is again entered on the key pad. A variety of commercially available locking mechanisms are suitable for use with the present invention. For example, the gang lock 10 may include Electronic Lock Model #3780-221E available from Lowe & Fletcher. In the illustrated embodiment, the cam 68 of Electronic Lock Model #3780-221E has been customized to add the cam slot 70.

In the illustrated embodiment, the drawer lock bar 14 is operatively coupled to the door lock bar 16 by a linkage 80 that translates vertical motion of the drawer lock bar 14 into horizontal motion of the door lock bar 16. This causes the drawer lock bar 14 and the door lock bar 16 to move in unison between locked and unlocked positions so that operation of a single locking mechanism simultaneously locks or unlocks the drawers and the doors.

The linkage 80 of the illustrated embodiment includes a cam and a cam follower arrangement. More specifically, the drawer lock bar 14 includes a cam 82 and the door lock bar 16 includes a cam follower 84 that is engaged with the cam 82. In the illustrated embodiment, the cam 82 extends inwardly from the drawer lock bar 14 and defines a cam slot 86 and the cam follower 84 extend from the drawer lock bar 16 into the cam slot 86. The cam slot 86 is configured so that downward movement of the drawer lock bar 14 results in retraction of the door lock bar 16 (i.e., movement of the door lock bar 16 toward the sidewall of the cabinet).

In the illustrated embodiment, the drawer lock bar 14 is in the locked position when raised and in the unlocked position when lowered. Similarly, the door lock bar 16 is in the locked position when extended and in the unlocked position when retracted. The direction of the drawer lock bar 14 and/or the door lock bar 16 may be reversed, if desired. For example, the drawer lock bar 14 may be unlocked when raised and/or the door lock bar 16 may be unlocked when extended. To illustrate one alternative embodiment, the linkage 80 may be reversed by so that lowering of the drawer lock bar 14 extends (rather than retracts) the door lock bar 16. For example, the linkage cam slot 86 can be reconfigured to curve in the opposite direction to reverse the direction of motion of the door lock bar 16.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X; Y; Z; X, Y, Z; X, Y; X, Z; Y, Z, and/or any other possible combination together or alone of those elements, noting that the same is open ended and can include other elements.

What is claimed is:

1. An article of furniture comprising:

at least one drawer;

at least one door;

a gang lock having a drawer lock bar and a door lock bar, the drawer lock bar being movable between a locked position in which the drawer lock bar prevents opening of the at least one drawer and an unlocked position in which the drawer lock bar permits opening of the at least one drawer; the door lock bar being movable between a locked position in which the door lock bar prevents opening of the at least one door and an unlocked position in which the door lock bar permits opening of the at least one door;

a linkage coupling the drawer lock bar to the door lock bar such that the drawer lock bar and the door lock bar move in unison; and a lock mechanism coupled to at least one of the drawer lock bar and the door lock bar, the lock mechanism includes a cam coupling the lock mechanism to the at least one of the drawer lock bar and the door lock bar wherein the lock mechanism can be actuated to simultaneously move the drawer lock bar and the door lock bar between the locked position and the unlocked position; and wherein the drawer lock bar is mounted to the article and is movable in a vertical direction between the locked position and the unlocked position; and wherein the door lock bar is mounted to the article and is movable in a horizontal direction between the locked position and the unlocked position.

2. The article of claim 1 wherein the linkage includes a cam and follower arrangement that translates vertical movement of the drawer lock bar into horizontal movement of the door lock bar.

3. The article of claim 2 wherein the drawer lock bar is recessed into a sidewall of the article.

4. The article of claim 3 wherein the door lock bar includes a hook and the door includes a strike plate, the hook configured to engage with the strike plate to secure the door in a closed position only when the door lock bar is in the locked position.

5. The article of claim 4 wherein the drawer lock bar includes an integral locking tab for each drawer to be locked by the gang lock.

6. A gang lock for an article of furniture comprising:

a lock mechanism having an actuator selectively movable between a first position and a second position, the actuator of the lock mechanism being a first cam, the first cam defining a first cam slot;

a drawer lock bar movably mounted to an article of furniture, the drawer lock bar being operatively coupled to the first cam of the lock mechanism whereby movement of the first cam between the first position and the second position moves the drawer lock bar linearly between a locked position and an unlocked position, the drawer lock bar preventing opening of at least one drawer in the article of furniture when in the locked position and permitting opening of the at least one drawer when in the unlocked position; and a door lock bar movably mounted to an article of furniture, the drawer lock bar being operatively coupled to the drawer lock bar whereby movement of the drawer lock bar between the locked position and the unlocked position moves the door lock bar linearly between a locked position and an unlocked position, the door lock bar preventing opening of at least one door in the article of furniture when in the locked position and permitting opening of the at least one door when in the unlocked position; and wherein the drawer lock bar includes a first cam follower fitted into the first cam slot, whereby movement of the first cam follower along the first cam slot provides linear movement to the drawer lock bar;

wherein the drawer lock bar is operatively coupled to the door lock bar by a linkage, the linkage including a second cam and a second cam follower;

wherein the drawer lock bar includes the second cam, the second cam defining a second cam slot;

wherein the door lock bar includes the second cam follower, the second cam follower fitted into the second cam slot, whereby movement of the second cam follower along the second cam slot provides relative movement between the drawer lock bar and the door lock bar;

wherein the drawer lock bar is oriented vertically and the drawer lock bar moves vertically between the locked and the unlocked positions; and wherein the door lock bar is oriented horizontally and the door lock bar moves horizontally between the locked and the unlocked positions.

7. The gang lock of claim 6 wherein the door lock bar includes a hook, the hook configured to selectively engage with a strike plate associated with a door.

8. The gang lock of claim 7 further including stop extending from a drawer, the stop configured to travel with a drawer as the drawer is opened and closed, the stop positioned to engage one of the locking tabs when the drawer lock bar is in the locked position and the drawer moves from a closed position toward the open position.

* * * * *